(12) United States Patent
Maciejczyk

(10) Patent No.: US 12,194,897 B2
(45) Date of Patent: Jan. 14, 2025

(54) INSERT FOR A CHILD SAFETY SEAT

(71) Applicant: BRITAX CHILDCARE PTY LTD., Port Melbourne (AU)

(72) Inventor: Wieslaw Maciejczyk, Port Melbourne (AU)

(73) Assignee: BRITAX CHILDCARE PTY LTD., Victoria (AU)

( * ) Notice: Subject to any disclaimer, the term of this patent is extended or adjusted under 35 U.S.C. 154(b) by 0 days.

(21) Appl. No.: 18/417,220

(22) Filed: Jan. 19, 2024

(65) Prior Publication Data

US 2024/0181942 A1 Jun. 6, 2024

Related U.S. Application Data

(63) Continuation of application No. 18/113,301, filed on Feb. 23, 2023, now Pat. No. 11,912,171, which is a continuation of application No. 17/526,378, filed on Nov. 15, 2021, now Pat. No. 11,590,865, which is a continuation of application No. 16/178,799, filed on Nov. 2, 2018, now Pat. No. 11,173,812.

(30) Foreign Application Priority Data

Nov. 2, 2017 (AU) .................. 2017904464

(51) Int. Cl.
*B60N 2/28* (2006.01)
*A44B 11/25* (2006.01)
*B60N 2/26* (2006.01)
*B60R 22/10* (2006.01)

(52) U.S. Cl.
CPC ........ *B60N 2/2812* (2013.01); *A44B 11/2503* (2013.01); *B60N 2/265* (2013.01); *B60R 22/105* (2013.01); *B60N 2002/2815* (2013.01); *B60N 2/2818* (2023.08)

(58) Field of Classification Search
CPC .. B60N 2/2866; B60N 2/2881; B60N 2/2812; B60N 2/265; B60N 2002/2818; A47B 1/2503; B60R 22/105
See application file for complete search history.

(56) References Cited

U.S. PATENT DOCUMENTS

2007/0182235 A1* 8/2007 Fonseca De Arruda .................. B60R 22/105 297/468

* cited by examiner

*Primary Examiner* — Syed A Islam

(74) *Attorney, Agent, or Firm* — K&L GATES LLP

(57) ABSTRACT

An insert for repositioning at least one of the harness straps of a child safety seat in order to accommodate an occupant smaller than the harness is configured to accommodate, wherein the insert is adapted to locate between the child safety seat and the occupant and includes a pair of waist strap guides, each waist strap guide configured to allow a waist strap of the harness to extend through and exit the waist strap guide at a position narrower than where the waist strap exits the child safety seat.

20 Claims, 6 Drawing Sheets

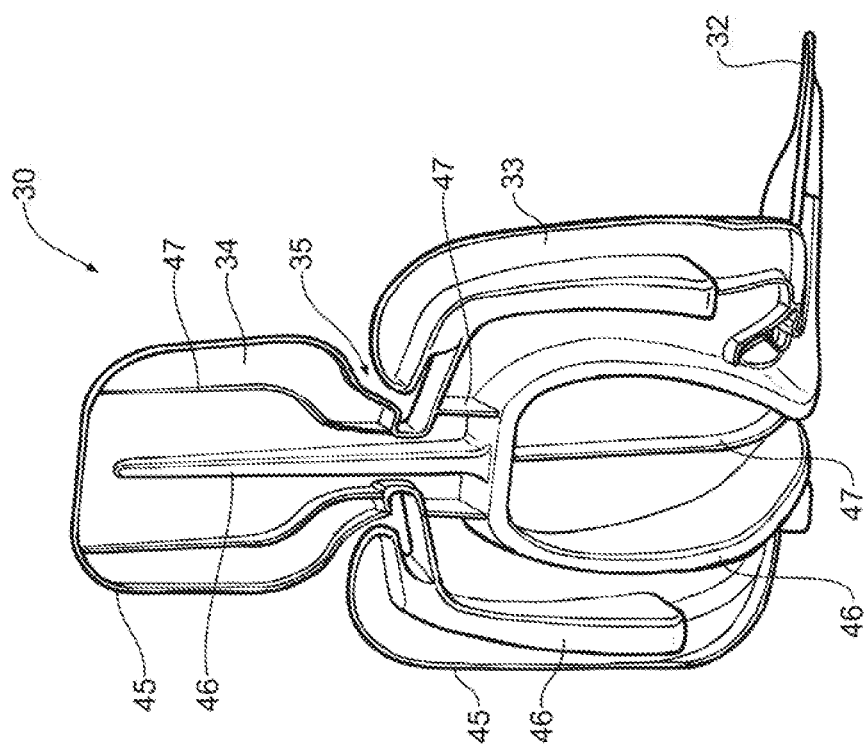
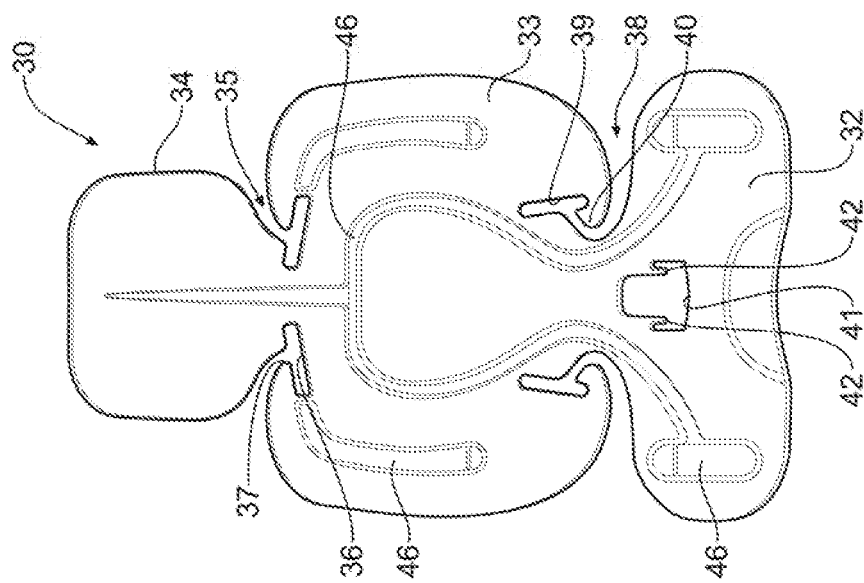

INSERT FOR A CHILD SAFETY SEAT

PRIORITY CLAIM AND CROSS-REFERENCE TO RELATED APPLICATIONS

The present application is a continuation of U.S. patent application Ser. No. 18/113,301, entitled "Insert for a Child Safety Seat," filed Feb. 23, 2023, which is a continuation of U.S. patent application Ser. No. 17/526,378, entitled "Insert for a Child Safety Seat," filed Nov. 15, 2021, and issued as U.S. Pat. No. 11,590,865 on Feb. 28, 2023, which is a continuation of U.S. patent application Ser. No. 16/178,799, entitled "Insert for a Child Safety Seat," filed Nov. 2, 2018, and issued as U.S. Pat. No. 11,173,812 on Nov. 16, 2021, which claims priority to AU Application No. 2017904464, filed Nov. 2, 2017, the disclosures of which are hereby incorporated by reference in their entirety and relied upon.

TECHNICAL FIELD

The present invention relates to an insert for a child safety seat. In a particular form the present invention relates to an insert for repositioning the harness straps of a child safety seat in order to accommodate an occupant smaller than the harness is configured to accommodate.

BACKGROUND

Child safety seats (including infant capsules) generally comprise a form giving shell comprising a seat portion, and a backrest portion, and may be of the booster seat variety, or the child safety seat may be secured with respect to the vehicle and have an independent harness which secures the child with respect to the safety seat.

Child safety seats are generally configured to accommodate children across a range of sizes. Various aspects of a child safety seat may be reconfigurable to accommodate larger or smaller occupants, such as adjustable headrests, seat recline angles and repositionable crotch, waist and shoulder harness straps.

For a child safety seat to accommodate a low birth weight (LBW) infant, a specific harness configuration may be required. For example, AS/NZ 1754:2013 has specific requirements in relation to the positioning of shoulder, waist and crotch strap slots as well as requirements in relation to harness buckle position for LBW child restraints. This required configuration complicates the design of the child safety seat, as the distance between the shoulder straps and waist straps is smaller by comparison to the typical harness configurations for larger (non LBW) infants and children.

Many existing child safety seat designs are not configured to accommodate LBW infants, and a separate child safety seat specifically designed for LBW infants is required, or the seat may have to undergo re-design and/or re-tooling in order to provide the required configuration. This adds considerable additional manufacturing and redesign expense for a capability that may only be used for a fraction of the life time of a seat, if at all (only 6% of babies born in Australia in both 1991 and 2004 were of low birth weight). It could well result in risks being taken with LBW infants using child safety seats that are not equipped to accommodate them.

While some seats are capable of accommodating LBW infants, they require a user to perform the awkward and time consuming act of re-threading the shoulder, waist and crotch straps through specific slots in the shell of the seat, only to have to repeat the process again when the child grows and no longer requires the LBW infant configuration.

It is against this background, and the problems and difficulties presented therein, that the present invention has been developed.

SUMMARY

According to a first aspect of the present invention, there is provided an insert for repositioning at least one of the harness straps of a child safety seat in order to accommodate an occupant smaller than the harness is configured to accommodate, wherein the insert is adapted to locate between the child safety seat and the occupant and includes a pair of waist strap guides, each waist strap guide configured to allow a waist strap of the harness to extend through and exit the waist strap guide at a position narrower than where the waist strap exits the child safety seat.

In one form, the insert includes a pair of shoulder strap guides, each shoulder strap guide configured to allow a shoulder strap of the harness to extend through and exit the shoulder strap guide at a position lower than where the shoulder strap exits the child safety seat.

In one form, the insert includes a crotch strap guide configured to allow at least one crotch strap to extend through and exit the crotch strap guide at a position rearward of where the at least one crotch strap exits the child safety seat.

In one form, each waist strap guide includes a waist strap slot and a waist strap channel, wherein the waist strap channel extends from a perimeter of the insert through to an intermediate position along the waist strap slot, intersecting the waist strap slot, such that a waist strap can be positioned within the waist strap slot via the waist strap channel.

In one form, each shoulder strap guide includes a shoulder strap slot and a shoulder strap channel, wherein the shoulder strap channel extends from a perimeter of the insert through to an intermediate position along the shoulder strap slot, intersecting the shoulder strap slot, such that a shoulder strap can be positioned within the shoulder strap slot via the shoulder strap channel.

In one form, the crotch strap guide is configured to allow a harness buckle and the at least one crotch strap to be inserted through.

In one form, the crotch strap guide shortens the available length of the at least one crotch strap extending through insert which repositions the height at which the harness buckle is presented.

According to a second aspect of the present invention, there is provided a child safety seat including a shell and an occupant support surface, a harness, wherein the harness includes a pair of shoulder straps, a pair of waist straps and at least one crotch strap extending through respective shoulder strap apertures, waist strap apertures and crotch strap apertures in the shell, and an insert for repositioning at least one of the harness straps in order to accommodate an occupant smaller than the harness is configured to accommodate, wherein the insert is adapted to locate between the child safety seat and the occupant and includes a pair of waist strap guides, each waist strap guide configured to allow one of the waist straps to extend through and exit the waist strap guide at a position narrower than where the waist strap exits the child safety seat.

In one form, the insert includes a pair of shoulder strap guides, each shoulder strap guide configured to allow a shoulder strap of the harness to extend through and exit the shoulder strap guide at a position lower than where the shoulder strap exits the child safety seat.

In one form, the insert includes a crotch strap guide configured to allow at least one crotch strap to extend through and exit the crotch strap guide at a position rearward of where the at least one crotch strap exits the child safety seat.

In one form, each waist strap guide includes a waist strap slot and a waist strap channel, wherein the waist strap channel extends from a perimeter of the insert through to an intermediate position along the waist strap slot, intersecting the waist strap slot, such that a waist strap can be positioned within the waist strap slot via the waist strap channel.

In one form, each shoulder strap guide includes a shoulder strap slot and a shoulder strap channel, wherein the shoulder strap channel extends from a perimeter of the insert through to an intermediate position along the shoulder strap slot, intersecting the shoulder strap slot, such that a shoulder strap can be positioned within the shoulder strap slot via the shoulder strap channel.

In one form, the crotch strap guide is configured to allow a harness buckle and the at least one crotch strap to be inserted through.

In one form, the crotch strap guide shortens the available length of the at least one crotch strap extending through insert which repositions the height at which the harness buckle is presented.

According to another aspect of the present invention, a child safety seat including a harness with a first waist strap that exits the child safety seat at a first waist strap opening and a second waist strap that exits the child safety seat at a second waist strap opening, where the first and the second waist strap opening are a first distance apart, and an insert adapted to be secured to a child safety seat. The insert includes a first waist strap guide configured to redirect the first waist strap from the first waist strap opening through the first waist strap guide at a first waist strap slot, maintain a portion of the first waist strap at the first waist strap slot, and redirect the first waist strap towards the second waist strap opening, a second waist strap guide configured to redirect the second waist strap from the second waist strap opening through the second waist strap guide at a second waist strap slot and maintain a portion of the second waist strap at the second waist strap slot, and increased thickness edges. The increased thickness edges coincide with the perimeter of the insert.

In one form, the first waist strap slot and the second waist strap slot are a second distance apart, the first distance being greater than the second distance.

In one form, the harness further includes at least one crotch strap, and the insert includes a crotch strap guide configured to redirect the at least one crotch strap from crotch strap openings through the crotch strap guide.

In one form, the crotch strap guide is located at a distance closer to the first waist strap slot and the second waist strap slot than the crotch strap openings.

In one form, the insert includes a rigid material that maintains the shape of the first waist strap guide and the second waist strap guide.

In one form, the rigid material includes a thermoplastic polymer.

In one form, the insert includes a base section, a backrest section, and a headrest section, where the base section is affixed to the backrest section and the backrest section is affixed to the headrest section.

In one form, the harness further includes a first shoulder strap and a second shoulder strap located, and the insert includes a first shoulder strap guide and a second shoulder strap guide configured to redirect the first shoulder strap and the second shoulder strap from a first shoulder strap opening and a second strap opening through the first shoulder strap guide and the second shoulder strap guide. The first shoulder strap corresponds with the first shoulder strap guide and the second shoulder strap corresponds with the second shoulder strap guide.

In one form, the first and the second shoulder strap openings are an initial distance apart, and the first and second shoulder strap guides are a final distance apart, where the final distance is shorter than the initial distance.

In one form, the insert is located between the child safety seat and an occupant of the child safety seat.

According to another aspect of the present invention, an insert adapted to be secured to a child safety seat, the insert including a first waist strap guide configured to redirect a first waist strap from a first waist strap opening through the first waist strap guide at a first waist strap slot, maintain a portion of the first waist strap at the first waist strap slot, and redirect the first waist strap towards a second waist strap opening, a second waist strap guide configured to redirect a second waist strap from a second waist strap opening through the second waist strap guide at a second waist strap slot and maintain a portion of the second waist strap at the second waist strap slot and increased thickness edges. The increased thickness edges coincide with the perimeter of the insert.

In one form, the first waist strap and second waist strap are portions of a harness routed through the child safety seat.

In one form, the harness further includes at least one crotch strap, and the insert includes a crotch strap guide configured to redirect the at least one crotch strap from crotch strap openings through the crotch strap guide.

In one form, the first waist strap opening and the second waist strap opening are formed in the child safety seat.

In one form, further including a rigid material that maintains the shape of the first waist strap guide and the second waist strap guide.

In one form, the rigid material includes a thermoplastic polymer.

In one form, the insert includes a base section, a backrest section, and a headrest section, where the base section is affixed to the backrest section and the backrest section is affixed to the headrest section.

In one form, the insert is located between a child safety seat and an occupant of the child safety seat.

In one form, further including reinforcement features molded into the insert.

In one form, further including reinforcement features molded into the insert.

BRIEF DESCRIPTION OF DRAWINGS

Embodiments of the present invention will be discussed with reference to the accompanying drawings wherein:

FIG. 1 is a front perspective view of an insert for repositioning the harness straps of a child safety seat, according to an embodiment;

FIG. 2 is a rear perspective view of the insert of FIG. 1;

DESCRIPTION OF EMBODIMENTS

FIGS. 1 and 2 illustrate an insert 30, according to an embodiment, for repositioning at least one of the harness straps of a child safety seat to accommodate an occupant (such as a low birth weight infant) smaller than the harness is configured to accommodate, the insert configured to locate between the child safety seat and the infant and includes a means for repositioning the harness straps without having to re-thread the straps through the child safety seat.

Figure 3:
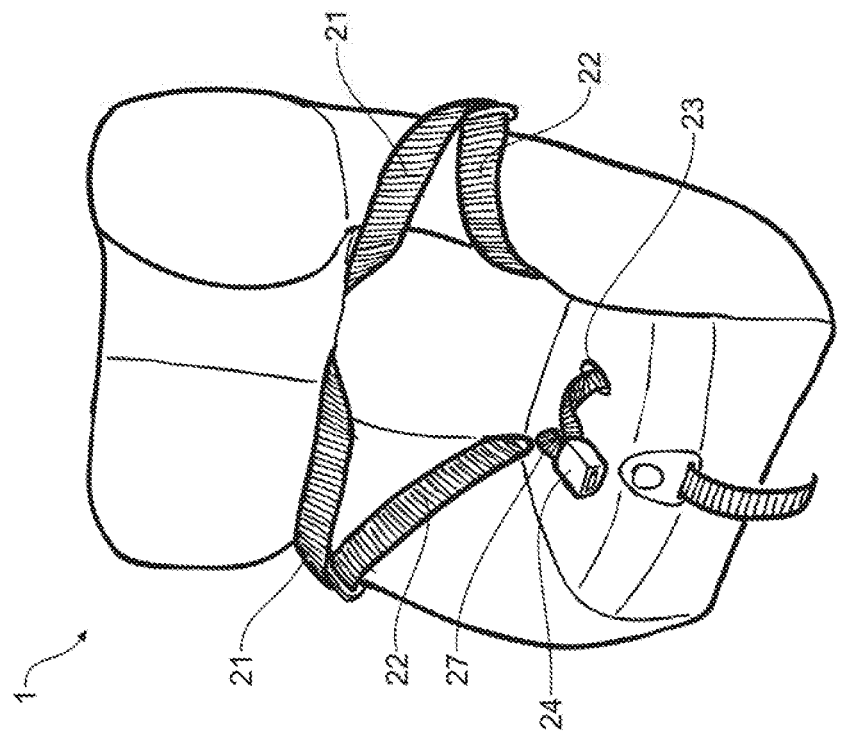
FIG. 3 is a front perspective view of a child safety seat, according to an embodiment.
Figure 8:
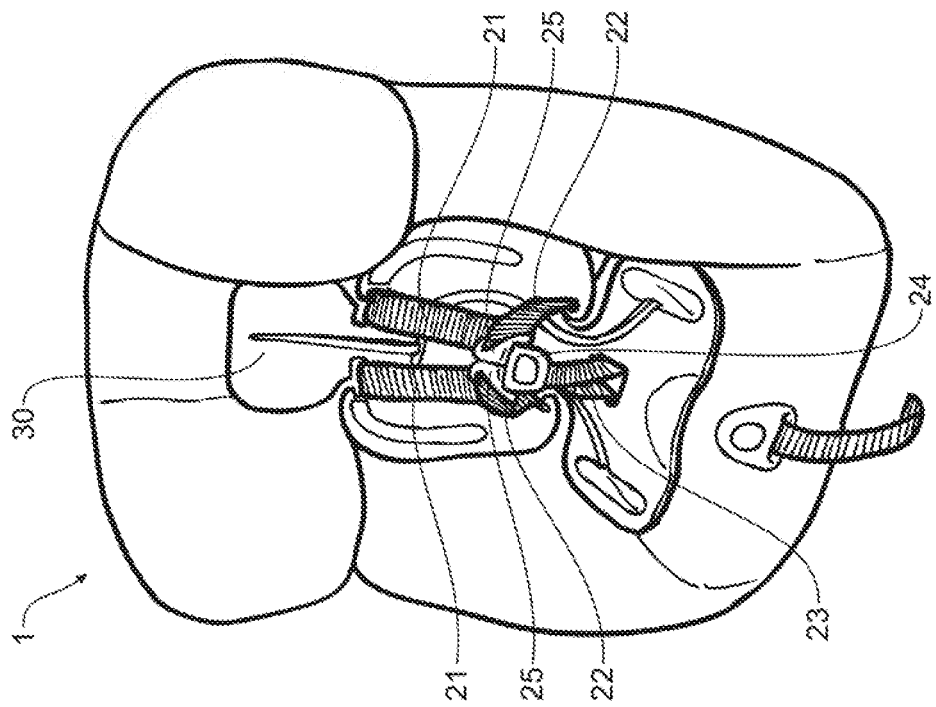
Figure 9:
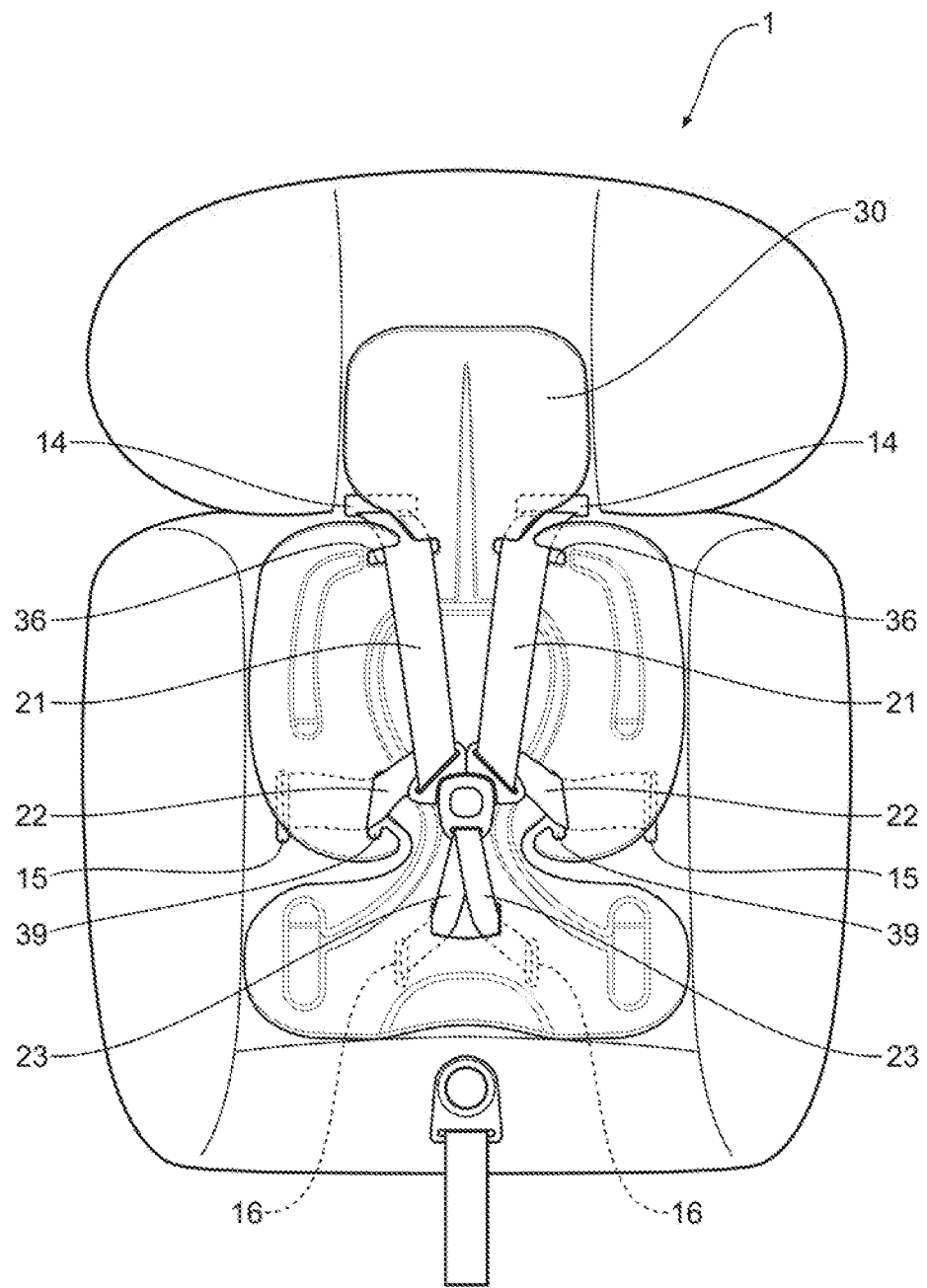
FIG. 9 is a front perspective schematic view of the child safety seat of FIG. 3 and the insert of FIG. 1, detailing how the insert repositions the harness straps.

Referring now to FIG. 3 where is shown a child safety seat 1 according to an embodiment. The child safety seat features a rigid structural shell covered by fabric trim and padding, presenting an occupant support surface upon which an occupant sits. The child safety seat 1 includes a harness, which includes a pair of shoulder straps 21, a pair of waist straps 22, and a pair of crotch straps 23, which are anchored to the seat and extend through respective shoulder strap apertures 14, waist strap apertures 15 and crotch strap apertures 16 in the seat (as best shown in FIG. 9) and connect together at a quick release device in the form of a buckle 24 and tongue 25 arrangement carried by the straps (as best shown in FIG. 8).

The child safety seat 1 may include a moveable headrest, where the shoulder strap apertures are located in the headrest, and the headrest is configured to move up and down with respect to the rest of the seat such that the position of the shoulder strap apertures are moved up and down with respect to the rest of the seat. In other embodiments, the child safety seat may include a plurality of discrete shoulder strap apertures distributed along the back of the shell, where repositioning of the shoulder straps occurs through disconnection and re-threading of the shoulder straps through the shoulder strap apertures in the shell. It will be appreciated that the use of a moveable headrest removes the need for having to re-thread the straps through the shell in order to change their position.

In some embodiments, the child safety seat 1 may include a plurality of discrete waist strap apertures in the shell, where repositioning of the waist straps occurs through disconnection and re-threading of the waist straps through the waist strap apertures in the shell.

While in the embodiment shown there is a pair of crotch straps 23 extending through a pair of crotch apertures 16 in the shell connected to a buckle 24 in a "v" configuration, in other embodiments, there may be a single crotch strap extending through a single crotch strap aperture in the shell. In some embodiments, the seat may include a plurality of discrete crotch strap apertures in the shell, where repositioning of the crotch strap(s) occurs through disconnection and re-threading of the crotch strap(s) through the crotch strap apertures in the shell.

Referring now to FIG. 8, where there is shown the child safety seat 1 of FIG. 3, including an insert 30 adapted to locate between the child safety seat and the infant on the occupant support surface. As shown in FIGS. 1 and 2, the insert 30 includes a rigid body having a base section 32, backrest section 33 and a headrest section 34, all configured to support a low birth weight infant.

The insert 30 further includes a pair of shoulder strap guides 35 extending through the body, the shoulder strap guides 35 configured to allow the shoulder straps 21 of the harness 20 to extend through the body. Each shoulder strap guide 35 includes a shoulder strap slot 36 and a shoulder strap channel 37, where the shoulder strap channel 37 extends from the perimeter of the body through to an intermediate position along the shoulder strap slot 36, intersecting the shoulder strap slot 36, such that a shoulder strap 21 can be positioned within the shoulder strap slot 36 via the shoulder strap channel 37 (as described in further detail below) without having to re-thread the shoulder strap 21 through the insert 30.

In an alternative embodiment (not shown), each shoulder strap guide may include first and second shoulder strap slot spaced apart from one another, and a shoulder strap channel, where the shoulder strap channel extends from the perimeter of the body and intersects with both the first and second shoulder strap slots at an intermediate position along each shoulder strap slot, such that a shoulder strap can be positioned within either the first or second shoulder strap slot via the shoulder strap channel without the need for re-threading.

The insert 30 also includes a pair of waist strap guides 38 extending through the body, the waist strap guides 38 configured to allow the waist straps 22 of the harness 20 to extend through the body without having to re-thread the waist straps 38. Similarly to the shoulder strap guides, each waist strap guide 38 includes a waist strap slot 39 and a waist strap channel 40, where the waist strap channel 40 extends from the perimeter of the body through to an intermediate position along the waist strap slot 39, intersecting the waist strap slot 39, such that a waist strap 22 can be positioned within the waist strap slot 39 via the waist strap channel 40 (as described in further detail below) without the need for re-threading.

While in the embodiment shown, the shoulder strap channels 37 extend from an upper point on the perimeter of the body, it will be appreciated that in alternative embodiments, the shoulder strap channels may extend from any point around the perimeter of the body. Similarly, the waist strap channels 40 may also extend from any point around the perimeter of the body. It will also be appreciated that the length and path that each channel follows may vary, as long as it extends from the perimeter of the body to its respective slot.

The insert 30 also includes a crotch strap guide 41 extending through the body. The crotch strap guide 41 is configured to allow the harness buckle 24 and connected crotch straps 23 to be inserted through (as best shown in FIGS. 4 to 8) and includes two projections 42 which act as a means for locating the crotch straps 23 within the crotch strap guide 41 (as described in further detail below).

Figure 11:
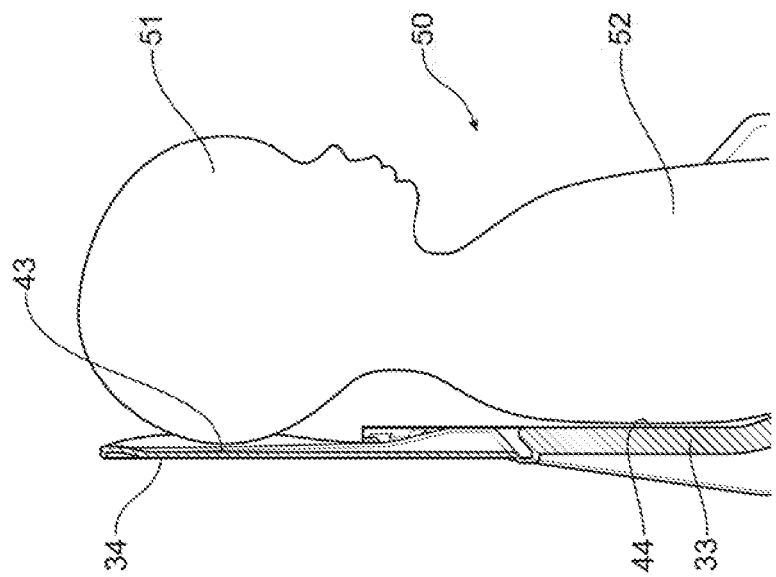
FIG. 11 is a side schematic cross section of the headrest and backrest sections of the insert and an occupant head and torso.

Referring now to FIG. 11, where there is shown a side schematic cross section of the headrest 34 and backrest sections 33 of the insert 30 and an occupant 50 head 51 and torso 52. It can be seen that head support surface 43 on the headrest section 34 is offset in relation to the torso or back support surface 44 of the backrest 33 by about 12 to 15 mm, as recommended for LBW infants by pediatricians.

The body of the insert 30 may be manufactured from a suitably rigid material such as a thermoplastic polymer (polypropylene for example) where it may be injection moulded. The body of the insert 30 may then be covered by trim and padding (not shown) in order to provide an attractive appearance and a snug fit for the LBW infant.

The body of the insert has a uniform thickness of approximately 3 mm, however in order to improve rigidity of the insert, the body may feature reinforcement in the form of increased thickness edges 45, deep channels or grooves 46, and ridges 47 moulded into the base 32, backrest 33 and headrest 34 sections (as best shown in FIGS. 1 and 2). It will appreciated that the backrest support surface 44 that supports the back of the LBW infant is substantially flat, avoiding a curved backrest that may be a feature of a child safety seat that could cause restriction in the infant's breathing.

Referring now to FIG. 9 where there is shown a perspective schematic view of the child safety 1 seat and harness 20, detailing how the insert 30 repositions the harness straps 21, 22, 23. It can be seen that when the insert 30 is located within the child safety seat 1, that the shoulder strap slots 36 are positioned below (or lower than) the shoulder strap apertures 14 in the seat 1, such that the position of the shoulder straps 21 extending through the shoulder strap slots 36 in the insert 30 is lower than the position of the shoulder straps 21 extending through the shoulder strap apertures 14 in the seat 1. It can also be seen that the waist strap slots 39 are positioned narrower than the waist strap apertures 15 in the seat 1, such that the position of the waist straps 22 extending through the waist strap slots 39 in the insert 30 is narrower than the position of the waist straps 22 extending through the apertures 15 in the seat 1. Finally, it can be seen that the crotch strap guide 41 is positioned rearward of the crotch strap apertures 16 in the seat 1, such that the position of the crotch straps 23 extending through the crotch strap guide 41 in the insert 30 is rearward of the position of the crotch straps 23 extending through the crotch strap apertures 16 in the seat 1. It will be appreciated that the positioning of the shoulder strap slots 36, waist strap slots 39 and crotch strap guide 41 can correspond to required harness 20 configuration for LBW child restraints.

Figure 10:
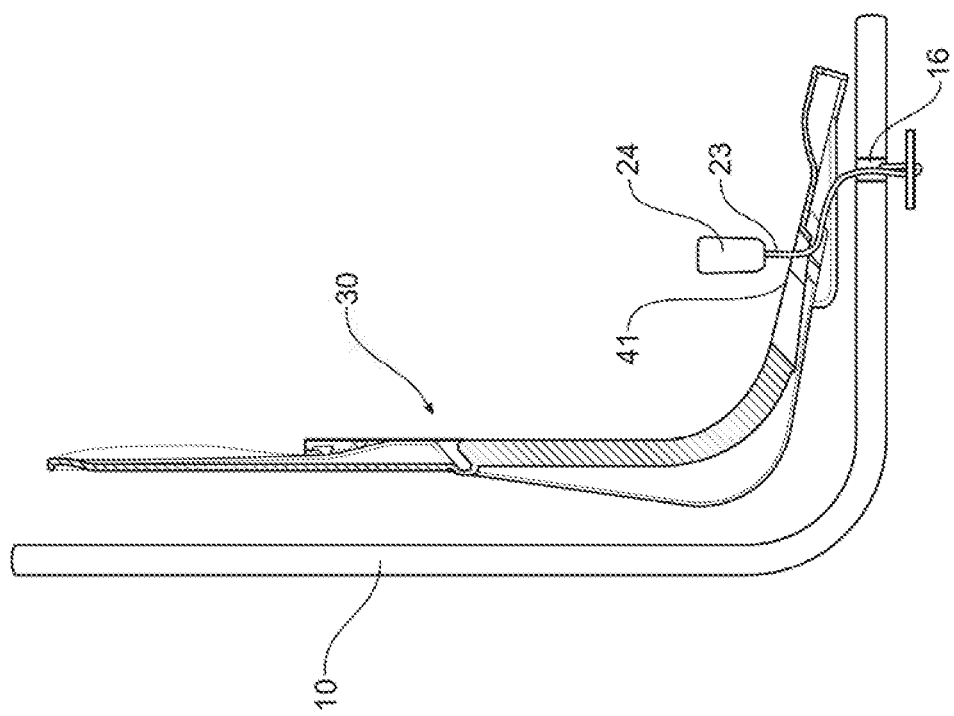
FIG. 10 is a cross sectional schematic view of a child safety seat according to an embodiment, detailing the relationship between the insert and the child safety seat shell and crotch strap.

Referring now to FIG. 10 where there is shown a cross sectional schematic detailing the relationship between the insert 30 and the child safety seat shell 10 and a crotch strap 23. It can be seen that in addition to repositioning the crotch strap 23 relative to the crotch strap aperture 16 in the shell 10, the insert 30 also shortens the available length of the crotch strap 23 extending through the insert 30, which repositions the height at which the buckle 24 is presented, such that the buckle 24 is in a preferred position just above the thigh height of the LBW infant.

In use, the insert 30 described above can be employed in the following method for repositioning the harness straps of a child safety seat, such that the child safety seat can accommodate a low birthweight infant.

Figure 4:
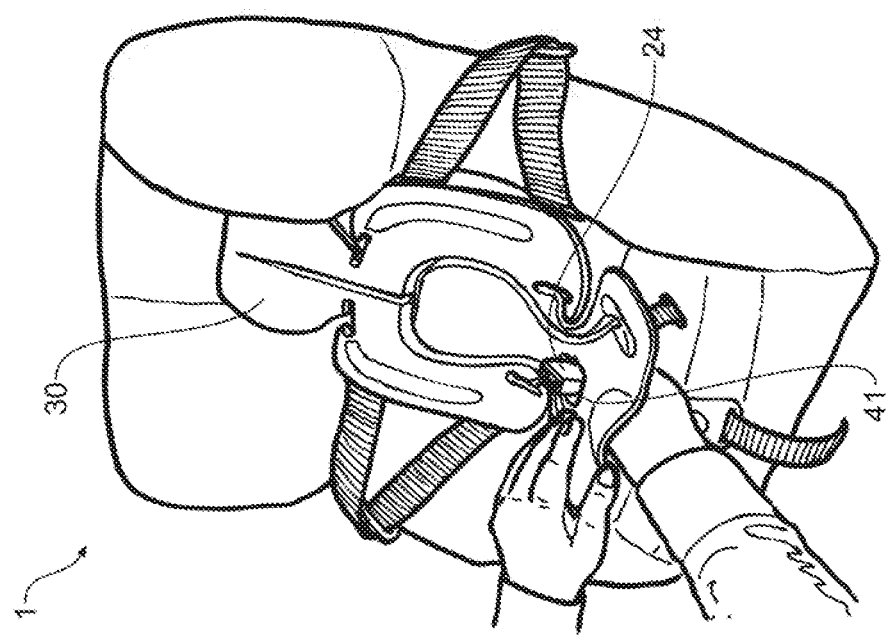
FIGS. 4 to 8 are front perspective views of the child safety seat of FIG. 3, detailing the steps of installing the insert of FIG. 1 in the child safety seat in order to reposition the harness straps of the child safety seat in order to accommodate a low birthweight infant.
Figure 5:
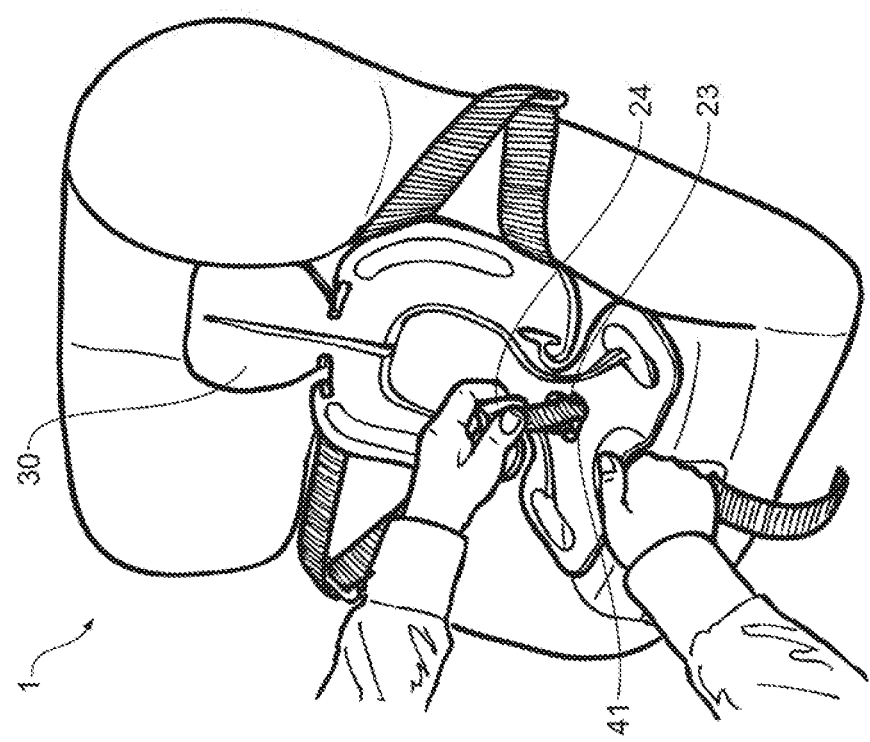

As shown in FIG. 3, the harness 20 is unbuckled, and the shoulder, waist and crotch straps 21, 22, 23 are laid out in order to receive the insert 30. As shown in FIGS. 4 and 5, the insert 30 is positioned roughly upon the occupant support surface 11, and the buckle 24 is inserted into the underside of the crotch strap guide 41, pulled through and located either side of the projections 42, such that the crotch straps 23 are substantially pulled through the crotch strap guide 41.

Figure 6:
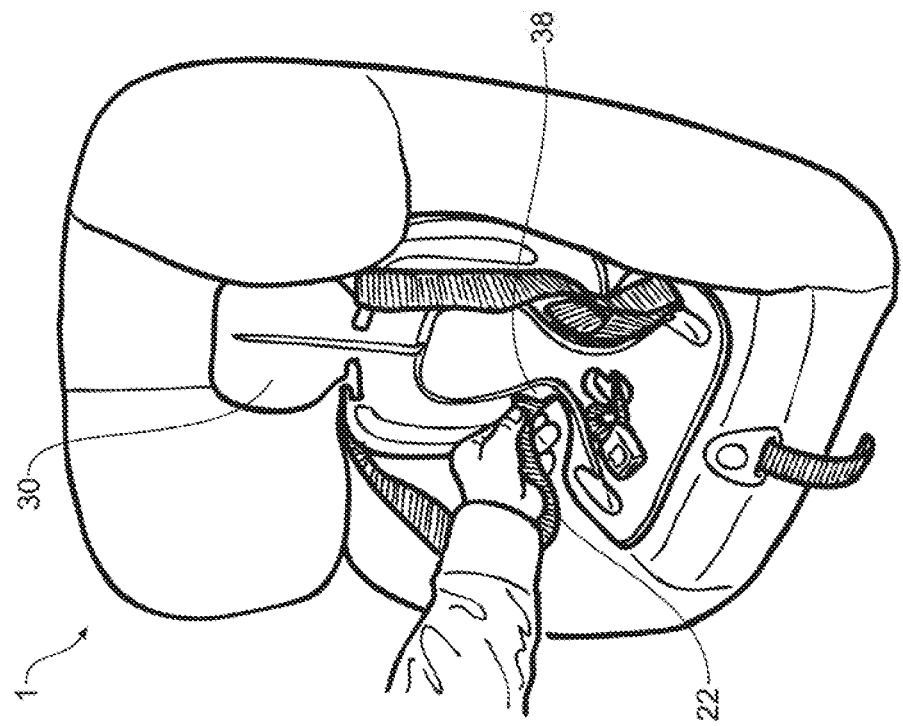

As shown in FIG. 6, each of the waist straps 22 are then guided through respective waist strap channels 40 and in to corresponding waist strap slots 39 located in the insert 30, where they are pulled through such that the waist straps 22 are substantially pulled through their respective waist strap slots 39.

Figure 7:
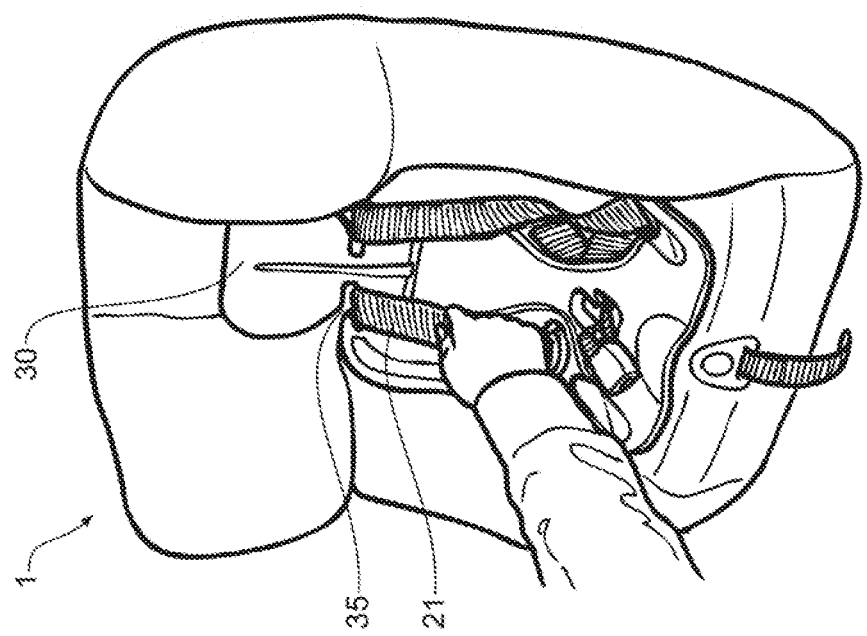

As shown in FIG. 7, each of the shoulder straps 21 are then guided through respective shoulder strap channels 37 and in to corresponding shoulder strap slots 36 located in the insert 30, where they are pulled through such that the shoulder straps 21 are substantially pulled through their respective shoulder strap slots 36.

As shown in FIG. 8, an infant (not shown) is then positioned upon the insert, and the shoulder, waist and crotch straps 21, 22, 23 are then buckled together, and any slack in the straps is then removed.

It will be appreciated that the above method is one example of the order in which the harness straps could be repositioned through the respective slots/guide in the insert, and alternative orders would arrive at the same result.

While in the embodiment shown, the insert 30 is placed upon the occupant support surface 11, and is held in position when the infant is secured with the harness, in alternative embodiments, the insert 30 may be mechanically secured with respect to the seat 1.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

What is claimed is:

1. A child safety seat comprising:
   a harness comprising a first waist strap that exits the child safety seat at a first waist strap opening and a second waist strap that exits the child safety seat at a second waist strap opening, wherein the first and the second waist strap opening are a first distance apart; and
   an insert adapted to be secured to a child safety seat, the insert comprising:
   a first waist strap guide configured to redirect the first waist strap from the first waist strap opening through the first waist strap guide at a first waist strap slot, maintain a portion of the first waist strap at the first waist strap slot, and redirect the first waist strap towards the second waist strap opening;
   a second waist strap guide configured to redirect the second waist strap from the second waist strap opening through the second waist strap guide at a second waist strap slot and maintain a portion of the second waist strap at the second waist strap slot; and
   increased thickness edges, wherein the increased thickness edges coincide with the perimeter of the insert.

2. The child safety seat of claim 1, wherein the first waist strap slot and the second waist strap slot are a second distance apart, the first distance being greater than the second distance.

3. The child safety seat of claim 1, wherein the harness further includes at least one crotch strap, and wherein the insert includes a crotch strap guide configured to redirect the at least one crotch strap from crotch strap openings through the crotch strap guide.

4. The child safety seat of claim 3, wherein the crotch strap guide is located at a distance closer to the first waist strap slot and the second waist strap slot than the crotch strap openings.

5. The child safety seat of claim 1, wherein the insert comprises a rigid material that maintains the shape of the first waist strap guide and the second waist strap guide.

6. The child safety seat of claim 5, wherein the rigid material comprises a thermoplastic polymer.

7. The child safety seat of claim 1, wherein the insert comprises a base section, a backrest section, and a headrest section, where the base section is affixed to the backrest section and the backrest section is affixed to the headrest section.

8. The child safety seat of claim 1, wherein the harness further includes a first shoulder strap and a second shoulder strap located, and wherein the insert includes a first shoulder strap guide and a second shoulder strap guide configured to redirect the first shoulder strap and the second shoulder strap from a first shoulder strap opening and a second strap opening through the first shoulder strap guide and the second shoulder strap guide, wherein the first shoulder strap corresponds with the first shoulder strap guide and the second shoulder strap corresponds with the second shoulder strap guide.

9. The child safety seat of claim 8, wherein the first and the second shoulder strap openings are an initial distance apart, and wherein the first and second shoulder strap guides are a final distance apart, wherein the final distance is shorter than the initial distance.

10. The child safety seat of claim 1, wherein the insert is located between the child safety seat and an occupant of the child safety seat.

11. The child safety seat of claim 1, further comprising reinforcement features molded into the insert.

12. An insert adapted to be secured to a child safety seat, the insert comprising:

a first waist strap guide configured to redirect a first waist strap from a first waist strap opening through the first waist strap guide at a first waist strap slot, maintain a portion of the first waist strap at the first waist strap slot, and redirect the first waist strap towards a second waist strap opening;

a second waist strap guide configured to redirect a second waist strap from a second waist strap opening through the second waist strap guide at a second waist strap slot and maintain a portion of the second waist strap at the second waist strap slot and increased thickness edges, wherein the increased thickness edges coincide with the perimeter of the insert.

13. The insert of claim 12, wherein the first waist strap and second waist strap are portions of a harness routed through the child safety seat.

14. The insert of claim 13, wherein:

the harness further includes at least one crotch strap; and the insert includes a crotch strap guide configured to redirect the at least one crotch strap from crotch strap openings through the crotch strap guide.

15. The insert of claim 12, wherein the first waist strap opening and the second waist strap opening are formed in the child safety seat.

16. The insert of claim 12, further comprising a rigid material that maintains the shape of the first waist strap guide and the second waist strap guide.

17. The insert of claim 16, wherein the rigid material comprises a thermoplastic polymer.

18. The insert of claim 12, wherein the insert comprises a base section, a backrest section, and a headrest section, where the base section is affixed to the backrest section and the backrest section is affixed to the headrest section.

19. The insert of claim 12, wherein the insert is located between a child safety seat and an occupant of the child safety seat.

20. The insert of claim 12, further comprising reinforcement features molded into the insert.

\* \* \* \* \*